(12) United States Patent
Chen et al.

(10) Patent No.: US 12,487,403 B2
(45) Date of Patent: Dec. 2, 2025

(54) METHOD FOR FABRICATING NONLINEAR OPTICAL WAVEGUIDE WITH GRADIENT REFRACTIVE INDEX DISTRIBUTION

(71) Applicant: SHANDONG NORMAL UNIVERSITY, Jinan (CN)

(72) Inventors: Chen Chen, Jinan (CN); Junlong Zhang, Jinan (CN); Feng Chen, Jinan (CN)

(73) Assignee: SHANDONG NORMAL UNIVERSITY, Jinan (CN)

(*) Notice: Subject to any disclaimer, the term of this patent is extended or adjusted under 35 U.S.C. 154(b) by 0 days.

(21) Appl. No.: 19/173,942

(22) Filed: Apr. 9, 2025

(65) Prior Publication Data
US 2025/0237813 A1   Jul. 24, 2025

(30) Foreign Application Priority Data
Apr. 9, 2024   (CN) .......................... 202410423461.3

(51) Int. Cl.
| G02B 6/134 | (2006.01) |
| G02F 1/19 | (2019.01) |
| G02F 1/355 | (2006.01) |
| G02F 1/365 | (2006.01) |
| G02B 6/13 | (2006.01) |

(52) U.S. Cl.
CPC ............. G02B 6/1347 (2013.01); G02F 1/19 (2013.01); G02F 1/3551 (2013.01); G02F 1/365 (2013.01); G02B 6/13 (2013.01)

(58) Field of Classification Search
CPC ........ G02B 6/1347; G02F 1/19; G02F 1/3551
See application file for complete search history.

(56) References Cited

U.S. PATENT DOCUMENTS

| 2023/0010459 A1* | 1/2023 | Chen ................. G02B 6/12007 |
| 2024/0069436 A1 | 2/2024 | Chen et al. |

FOREIGN PATENT DOCUMENTS

CN   116154586 A   5/2023

* cited by examiner

*Primary Examiner* — Daniel Petkovsek

(57) ABSTRACT

A method for fabricating a nonlinear optical waveguide with gradient refractive index distribution, in which a nonlinear optical crystal is prepared; a type of first heavy ions, a type of second heavy ions and parameters related to an irradiation process are determined; the first heavy ions are accelerated to generate a first ion beam; the nonlinear optical crystal is bombarded with the first ion beam to obtain a primary processed crystal; the second heavy ions are accelerated to generate a second ion beam; the primary processed crystal is bombarded with the second ion beam to obtain a secondary processed crystal; and the secondary processed crystal is segmented to obtain the desired optical waveguide.

5 Claims, 15 Drawing Sheets

METHOD FOR FABRICATING NONLINEAR OPTICAL WAVEGUIDE WITH GRADIENT REFRACTIVE INDEX DISTRIBUTION

CROSS-REFERENCE TO RELATED APPLICATIONS

This application claims the benefit of priority from Chinese Patent Application No. 202410423461.3, filed on Apr. 9, 2024. The content of the aforementioned application, including any intervening amendments made thereto, is incorporated herein by reference in its entirety.

TECHNICAL FIELD

This application relates to optical materials and integrated optical technology, and more particularly to a method for fabricating a nonlinear optical waveguide with gradient refractive index distribution.

BACKGROUND

Nonlinear optical crystals have the characteristics of second-order nonlinear polarization response. When light passes through nonlinear optical crystals, the frequency of a part of the light will change and propagate forward with a new vibration frequency. Therefore, nonlinear optical crystals have been widely used as optical frequency converters, prepared into optical waveguides, and applied to specific integrated optical circuit components to expand the wavelength range of light and modulate parameters such as the intensity and phase of light.

In the nonlinear conversion process of light, the intensity of the frequency-converted light in the nonlinear optical crystal is proportional to the square of the power density of the fundamental frequency light, and the conversion efficiency of light is also proportional to the power density of the fundamental frequency light in the nonlinear optical crystal. The power density of the fundamental frequency light in the optical waveguide is proportional to the fundamental frequency light power and inversely proportional to the transmission cross-sectional area of the optical waveguide. Therefore, the optical waveguide prepared with nonlinear optical crystal as the matrix can be used as an optical frequency converter in a specific integrated optical circuit, so that the optical circuit can exhibit more excellent nonlinear performance, thereby facilitating the preparation of optical devices with small size and compact structure, which are easier to integrate on chip.

In the prior art, in order to further improve the frequency conversion efficiency of optical waveguides prepared with nonlinear optical crystals, the core size of the optical waveguide is commonly reduced to further reduce the area of the transmission cross section of the optical waveguide. However, this method puts forward higher requirements on the preparation technology of optical waveguides. Moreover, the prepared optical waveguide has a relatively small core cross-section, while the existing optical waveguide end coupling device have a relatively large spot size for the output light, which poses a difficult matching between the optical waveguide and the end coupling device. This leads to low coupling efficiency between the end coupling device and the optical waveguide, thereby causing serious light loss.

SUMMARY

An object of the disclosure is to provide a method for fabricating a nonlinear optical waveguide with gradient refractive index distribution. The method adopts a nonlinear optical crystal as a matrix. The optical waveguide structure fabricated by the method has a focusing capability, which can constrain a light field to converge to a center of the optical waveguide without reducing the cross-sectional size of the optical waveguide core, resulting in an improved frequency conversion efficiency of the optical waveguide. The optical waveguide is suitable as a frequency converter to improve the optical frequency conversion efficiency of the optical path.

In order to achieve the above object, the following technical solutions are adopted.

In a first aspect, this application provides a method for fabricating an optical waveguide with a focusing capability, comprising:

(S1) preparing a desired nonlinear optical crystal, and determining a type of first heavy ions, a type of second heavy ions and parameters related to an irradiation process;

(S2) accelerating the first heavy ions to generate a first ion beam; and bombarding the desired nonlinear optical crystal with the first ion beam to form a first refractive index dip at a first depth along a depth direction of the nonlinear optical crystal, so as to obtain a primary processed crystal;

(S3) accelerating the second heavy ions to generate a second ion beam; and bombarding the primary processed crystal with the second ion beam to form a second refractive index dip at a second depth along a depth direction of the primary processed crystal, so as to obtain a secondary processed crystal; and (S4) segmenting the secondary processed crystal to obtain the optical waveguide.

Appropriate heavy ions are selected, and accelerated to a suitable speed level. At this time, the heavy ion beam consisting of the accelerated heavy ions carries a certain amount of energy. When the heavy ion beam is used to bombard the nonlinear optical crystal, the ion beam interacts with the nonlinear optical crystal. Since the electron energy damage of the irradiation ions plays a major role in the change of the structure and the refractive index of the material, the refractive index of the bombarded part of the nonlinear optical crystal will change significantly.

An electron stopping power Se of an optical crystal material has an amorphous threshold $Se_{th}$. When the electron stopping power Se exceeds the amorphous threshold $Se_{th}$, the irradiation ions will form a quasi-continuous amorphous track in the optical crystal with a cross-sectional radius r related to the size of Se. After being treated by heavy ion irradiation, a dielectric constant ε of the optical crystal is macroscopically expressed as a weighted average of the amorphous track and an original dielectric constant:

$$\overline{\varepsilon_{e,o}} = n_{e,o}^2 = f\varepsilon_a + (1-f)\varepsilon_{e,o}$$

In the above equation, the amorphous weight coefficient f is proportional to a current heavy ion irradiation dose Φ and a cross-sectional area of the amorphous track, expressed as:

$$f \propto \Phi \pi r^2$$

It can be seen from the above equation that the formed amorphous track has a significant effect on the refractive index of the material. Therefore, only an extremely low irradiation dose is sufficient to cause a refractive index change equivalent to that induced by a high-dose ion implantation.

The energy carried by the ion beam is adjusted so that the ion beam carries high energy. If primary high-energy ion irradiation is used alone on the nonlinear optical crystal, the first ion beam carrying high energy will cause electronic damage to the nonlinear optical crystal. After the nonlinear optical crystal is irradiated with the first ion beam, the refractive index of the irradiated part changes, and the first refractive index dip appears at the first depth. The specific value of the first depth is directly related to the magnitude of the energy carried by the first ion beam during this primary high-energy ion irradiation process. The influence of primary high-energy ion irradiation processing on the refractive index of the nonlinear optical crystals is shown in FIG. 1.

FIG. 1 shows refractive index change along a depth direction of an irradiated nonlinear optical crystal obtained by only performing preparation for irradiation processing and primary high-energy ion irradiation in the above method, where the abscissa represents a depth value of the irradiated nonlinear optical crystal, and the ordinate represents a relative refractive index of the irradiated nonlinear optical crystal. It can be clearly seen from FIG. 1 that the refractive index of the nonlinear optical crystal changes under the influence of the primary high-energy ion irradiation. Starting from the surface of the nonlinear optical crystal and advancing along the depth direction, the refractive index shows a trend of gradually decreasing and then gradually increasing, and the first refractive index dip appears at the first depth $d_1$.

Similarly, the energy carried by the second ion beam is adjusted to be lower than the energy carried by the first ion beam during primary high-energy ion irradiation. When the second ion beam is used to irradiate the nonlinear optical crystal, the second ion beam carrying the sub-high energy will also cause electron damage to the nonlinear optical crystal, the refractive index will also change in the irradiated part of the nonlinear optical crystal, and a second refractive index dip will appear at the second depth. The specific value of the second depth is also directly related to the energy carried by the second ion beam during this secondary high-energy ion irradiation process. The effect of secondary high-energy ion irradiation on the refractive index of nonlinear optical crystals is shown in FIG. 2.

FIG. 2 shows refractive index change along a depth direction of an irradiated nonlinear optical crystal obtained by only performing preparation for irradiation processing and secondary high-energy ion irradiation in the above method, where the abscissa represents a depth value of the irradiated nonlinear optical crystal, and the ordinate represents a relative refractive index of the irradiated nonlinear optical crystal. It can be clearly seen from FIG. 2 that the refractive index of the nonlinear optical crystal changes under the influence of the secondary high-energy ion beam irradiation. Starting from the surface of the nonlinear optical crystal and advancing along the depth direction, the crystal refractive index shows a trend of gradually decreasing and then gradually increasing, and a second refractive index dip appears at the second depth $d_2$.

When the above primary high-energy ion irradiation and secondary high-energy ion irradiation processes are superimposed, the two ion irradiation processes will cause electron damage to the nonlinear optical crystal respectively, and each electron damage will cause a corresponding change in the refractive index of the nonlinear optical crystal. Since the depth of the crystal refractive index dip after ion irradiation is directly related to the energy carried by the ion beam, after being treated by both primary high-energy ion irradiation and secondary high-energy ion irradiation, the first refractive index dip caused by the primary high-energy ion irradiation process and the second refractive index dip caused by the secondary high-energy ion irradiation process are staggered. As a result, the nonlinear optical crystal presents a state of two refractive index dips coexisting. The influence of superimposing the above primary high-energy ion irradiation and secondary high-energy ion irradiation on the refractive index of the nonlinear optical crystal is shown in FIG. 3.

FIG. 3 shows refractive index change along a depth direction of an irradiated nonlinear optical crystal obtained by performing steps (S1)-(S3) in the above method, where the abscissa represents a depth value of the irradiated nonlinear optical crystal, and the ordinate represents a relative refractive index of the irradiated nonlinear optical crystal. It can be clearly seen from FIG. 3 that under the influence of the two ion irradiations, starting from the surface of the nonlinear optical crystal and advancing along the depth direction, the relative refractive index of the nonlinear optical crystal exhibits a trend of continuously decreasing first until the second refractive index dip appears at the second depth $d_2$, subsequently increasing and then decreasing until the first refractive index dip appears at the first depth $d_1$, and then gradually increasing again. In other words, starting from the surface of the nonlinear optical crystal and advancing along the depth direction, the relative refractive index of the crystal changes roughly in a "w" shape.

For the optical waveguide fabricated by the above method, after light is coupled into the optical waveguide along the light-input surface, since the relative refractive index of the crystal continuously decreases before reaching the first depth $d_1$ and continuously increases after passing the second depth $d_2$, the light coupled into the optical waveguide must be transmitted only between the first depth $d_1$ and the second depth $d_2$ of the nonlinear optical crystal. The region between the first depth $d_1$ and the second depth $d_2$ of the nonlinear optical crystal can be regarded as a waveguide core $WG_{core}$. Moreover, as the relative refractive index between the first depth $d_1$ and the second depth $d_2$ of the nonlinear optical crystal exhibits a trend of gradually increasing and then gradually decreasing, when the light coupled into the optical waveguide is transmitted in the waveguide core $WG_{core}$, the light will converge toward the region with a higher refractive index in the waveguide core $WG_{core}$ crystal. In this way, when the optical waveguide fabricated by the method in the present disclosure is applied in practice, the light coupled into the optical waveguide will be naturally transmitted along the waveguide core $WG_{core}$. During the transmission in the waveguide core $WG_{core}$, the light also exhibits a focusing effect. Therefore, during light transmission in the crystal, the power density of the fundamental frequency can be greatly improved without artificially reducing the core size of the optical waveguide, thereby effectively improving the light frequency conversion efficiency of the optical waveguide, and avoiding the problems of high manufacturing difficulty and low end-face coupling efficiency caused by reduced core size of the optical waveguide in the prior art.

In some embodiments, step (S2) comprises:
   (S2.1) placing the nonlinear optical crystal in an irradiation target chamber;

(S2.2) accelerating, by an ion accelerator, the first heavy ions to generate the first ion beam; and (S2.3) bombarding the nonlinear optical crystal with the first ion beam to form a first optical barrier at the first depth along the depth direction of the nonlinear optical crystal, so as to obtain the primary processed crystal.

In some embodiments, step (S3) comprises:

(S3.1) placing the primary processed crystal in the irradiation target chamber;

(S3.2) accelerating, by the ion accelerator, the second heavy ions to generate the second ion beam; and (S3.3) bombarding the primary processed crystal with the second ion beam to form a second optical barrier at the second depth along the depth direction of the primary processed crystal, so as to obtain the secondary processed crystal.

In some embodiments, the type of the first heavy ions is the same as the type of the second heavy ions.

The type of heavy ions determines a width $w_b$ of the refractive index dip. If the type of the first heavy ions used in the primary high-energy ion irradiation is the same as the type of the second heavy ions used in the secondary high-energy ion irradiation, the width $w_{b1}$ of the of the first optical barrier $b_1$ as shown in FIG. 1 will be consistent with the width $w_{b2}$ of the second optical barrier $b_2$ as shown in FIG. 2. After the nonlinear optical crystal is processed by both primary high-energy ion irradiation and secondary high-energy ion irradiation processes, the first optical barrier $b_1$ and the second optical barrier $b_2$ existing on the same optical waveguide will be roughly symmetrically distributed, which is conductive to achieve high-quality optical transmission effects.

In some embodiments, an energy carried by the first ion beam is greater than an energy carried by the second ion beam.

In some embodiments, step (S1) comprises:

(S1.1) cutting an original nonlinear optical crystal into a regular shape to obtain a to-be-processed nonlinear optical crystal;

(S1.2) polishing an upper surface, a light-input end face and a light-output end face of the to-be-processed nonlinear optical crystal to obtain the desired nonlinear optical crystal;

(S1.3) determining the type of the first heavy ions and the type of the second heavy ions according to a light guiding requirement of the optical waveguide;

(S1.4) analyzing the first optical barrier required by the optical waveguide, and determining the energy carried by the first ion beam according to the first depth where the first refractive index dip is located; and (S1.5) analyzing the second optical barrier required by the optical waveguide, and determining the energy carried by the second ion beam according to the second depth where the second refractive index dip is located.

In some embodiments, step (S4) comprises:

(S4.1) ablating, by a surface ablation device, a first optical waveguide side on an upper surface of the secondary processed crystal; and (S4.2) ablating, by the surface ablation device, a second optical waveguide side on the upper surface of the secondary processed crystal, wherein a portion enclosed by the first optical waveguide side and the second optical waveguide side is the optical waveguide.

In some embodiments, each of the first optical waveguide side and the second optical waveguide side extends from a light-input end surface of the secondary processed crystal to a light-output end surface of the secondary processed crystal; along a direction from the light-input end surface to the light-output end surface, the first optical waveguide side comprises a first input section, a first transition section and a first output section in sequence, and the second optical waveguide side comprises a second input section, a second transition section and a second output section in sequence; and along the direction from the light-input end surface to the light-output end surface, the first input section has the same length as the second input section, the first input section is parallel to the second input section, the first transition section has the same length as the second transition section, a spacing between the first transition section and the second transition section is decreasing, the first output section has the same length as the second output section, and the first output section is parallel to the second output section.

When the optical waveguide fabricated by the method in the present disclosure is applied in practice, since the first transition section has the same length as the second transition section and a spacing between the first transition section and the second transition section is decreasing, a spacing between the first input section and the second input section is significantly wider than that between the first output section and the second output section. An end-face coupling device can be arranged on a side of the optical waveguide corresponding to the light-input end surface. After being coupled into the optical waveguide, the light will first be transmitted between the first input section and the second input section with a relatively wide spacing. When passing through the first transition section and the second transition section, the light transmission channel narrows transversely, and the light is gradually focused in the width direction. Finally, the light is output between the first output section and the second output section, and is delivered to a next-stage optical path device.

In a second aspect, this application provides an optical waveguide, wherein the optical waveguide is fabricated by the above method.

In a third aspect, this application provides a frequency converter, comprising the above optical waveguide.

Compared to the prior art, the present disclosure has the following beneficial effects.

The heavy ion irradiation process leads to a change on the refractive index of the nonlinear optical crystal at the bombarded region. The energies carried by the heavy ion beams used in the two irradiation treatments are adjusted to be different. By irradiating with heavy ion beams carrying different energies, two distinct optical barriers are formed on the nonlinear optical crystal. The region between the two optical barriers has a gradient and relatively increased index, resulting in an obvious sandwich-type optical waveguide structure. When light is transmitted in such sandwich-type waveguide structure, the light will converge between the two optical barriers under the influence of the refractive index. Therefore, the method in the present disclosure constructs a new refractive index distribution in the nonlinear optical crystal. The optical waveguide structure fabricated by this method has a focusing capability, which can constrain the light field to converge towards the center of the optical waveguide. This significantly increases the power density of a fundamental-frequency light during light transmission in the crystal, thereby improving the conversion efficiency of the optical waveguide fabricated by the method when used as a frequency converter.

BRIEF DESCRIPTION OF THE DRAWINGS

In order to make the technical solutions of the embodiments of the present disclosure or the technical solutions in the prior art clearer, the accompanying drawings required in the description of the embodiments or prior art will be briefly described below. Obviously, presented in the drawings are merely some embodiments of the disclosure. For those of ordinary skill in the art, other drawings can be obtained based on the drawings of the disclosure without making creative efforts.

DETAILED DESCRIPTION OF EMBODIMENTS

The technical solutions of the present disclosure will be clearly and completely described below in conjunction with the accompanying drawings and embodiments. Obviously, described below are only some embodiments of the present disclosure, instead of all embodiments of the present disclosure. Based on the embodiments in the present disclosure, all other embodiments obtained by those of ordinary skill in the art without making creative efforts shall fall within the scope of the present disclosure.

It should be noted that all directional indications (such as up, down, left, right, front, back . . . ) in the description of the embodiments are merely intended to explain a relative positional relationship, movement, etc. between components in a specific posture (as shown in the accompanying drawings). When the specific posture changes, the directional indication changes accordingly.

In addition, descriptions involving "first", "second", etc. in this application are only descriptive, and cannot be understood as indicating or implying relative importance or implicitly indicating the number of indicated technical features. Therefore, features defined as "first" and "second" can explicitly or implicitly include at least one of the features. In addition, "and/or" in the entire specification includes three solutions. For example, A and/or B includes technical solution A, technical solution B, and a combination of A and B. Moreover, technical solutions in the embodiments can be combined with each other, but must be based on what can be achieved by those of ordinary skill in the art. When the combination of technical solutions appears to be contradictory or cannot be realized, it should be deemed that such combination of technical solutions does not exist and is not within the scope of the present disclosure defined by the appended claims.

Figure 1:
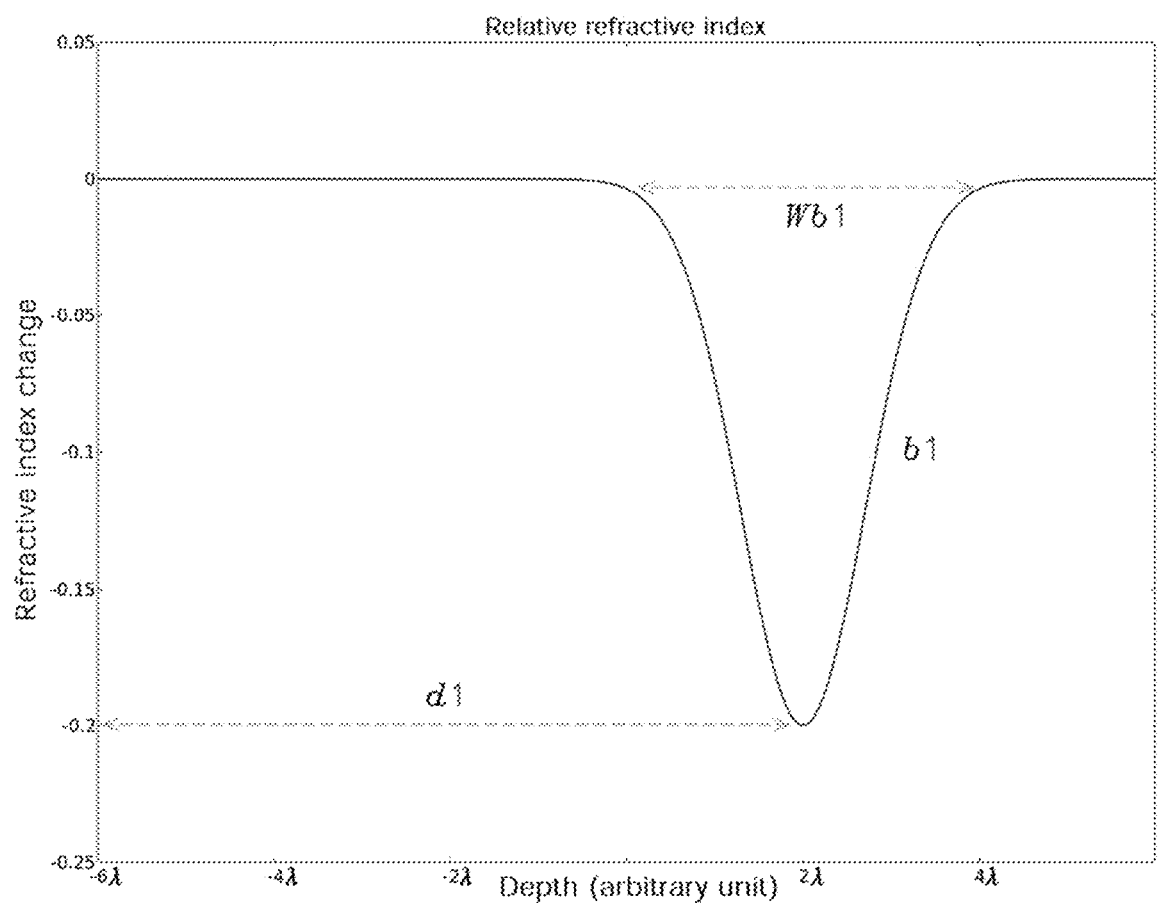
FIG. 1 shows refractive index change along a depth direction of an irradiated nonlinear optical crystal obtained by only performing preparation for irradiation processing and primary high-energy ion irradiation in a method for fabricating an optical waveguide with a focusing capability in accordance with an embodiment of the present disclosure, where the abscissa represents a depth value of the irradiated nonlinear optical crystal, and the ordinate represents a relative refractive index of the irradiated nonlinear optical crystal.
Figure 2:
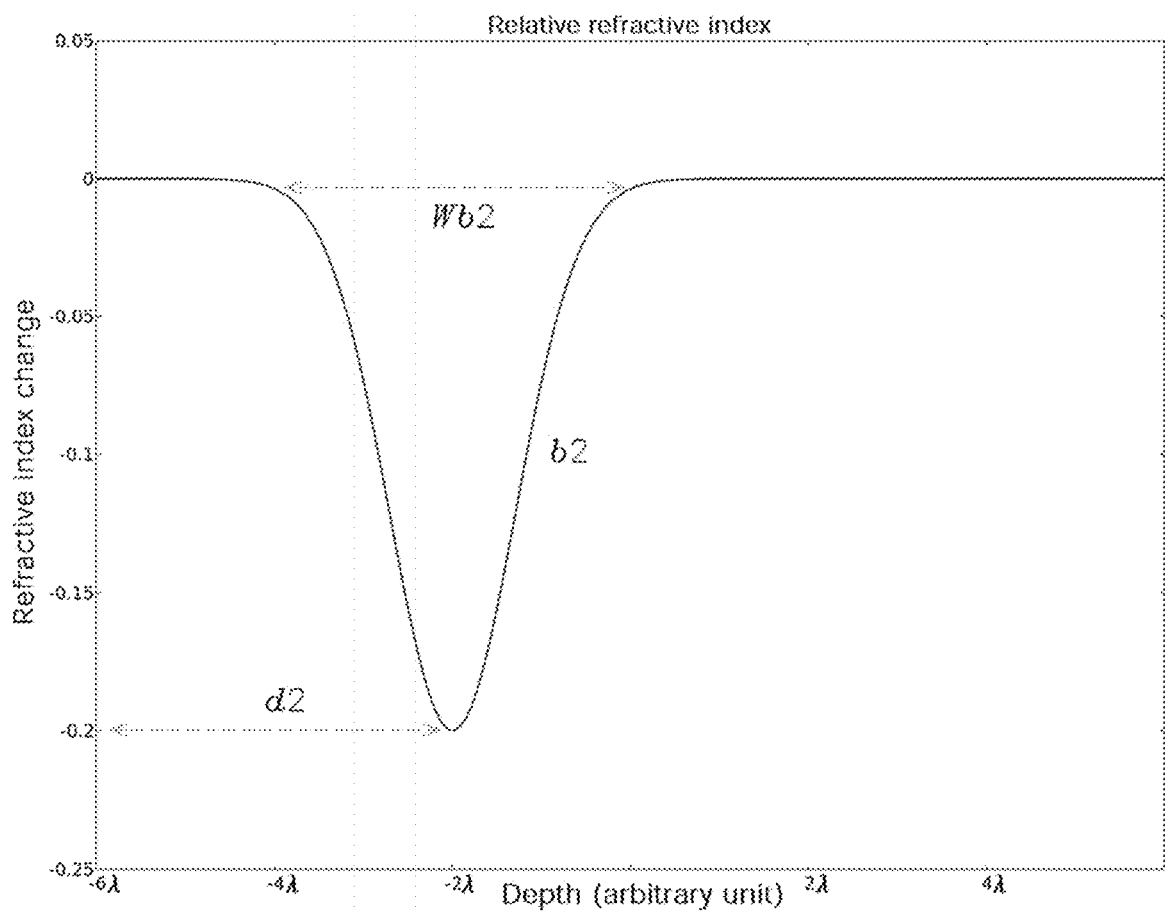
FIG. 2 shows refractive index change along a depth direction of an irradiated nonlinear optical crystal obtained by only performing preparation for irradiation processing and secondary high-energy ion irradiation in the method in accordance with an embodiment of the present disclosure, where the abscissa represents a depth value of the irradiated nonlinear optical crystal, and the ordinate represents a relative refractive index of the irradiated nonlinear optical crystal.
Figure 3:
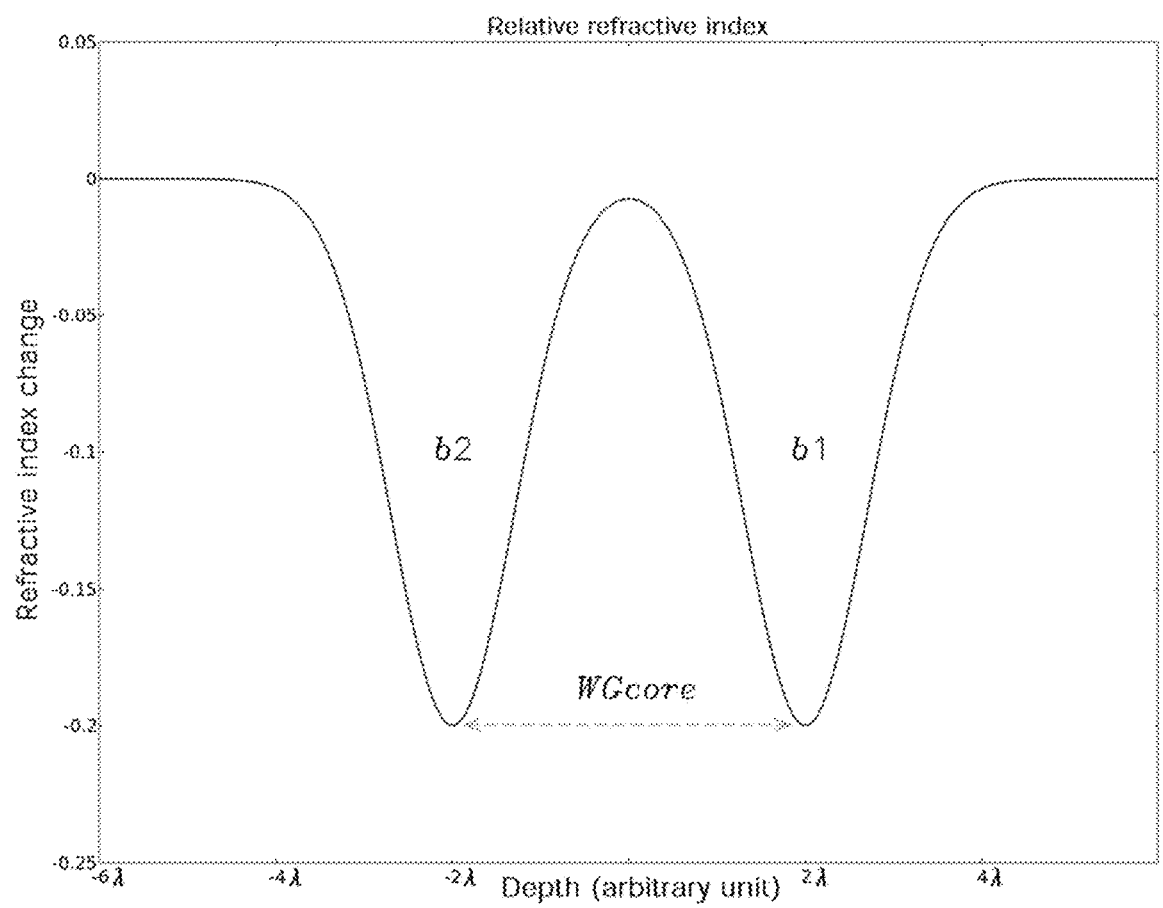
FIG. 3 shows refractive index change along a depth direction of an irradiated nonlinear optical crystal obtained by performing preparation for irradiation processing, primary high-energy ion irradiation and secondary high-energy ion irradiation in the method in accordance with an embodiment of the present disclosure, where the abscissa represents a depth value of the irradiated nonlinear optical crystal, and the ordinate represents a relative refractive index of the irradiated nonlinear optical crystal.
Figure 4:
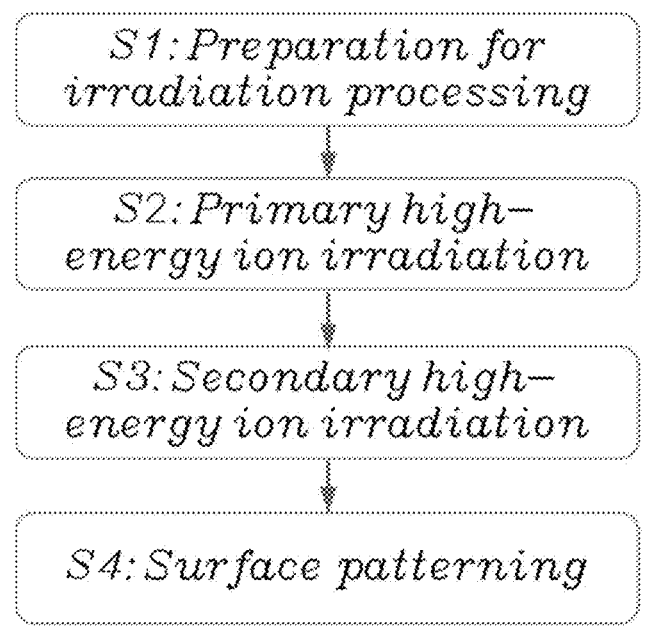
FIG. 4 is a flow chart of the method in accordance with an embodiment of the present disclosure.
Figure 5:
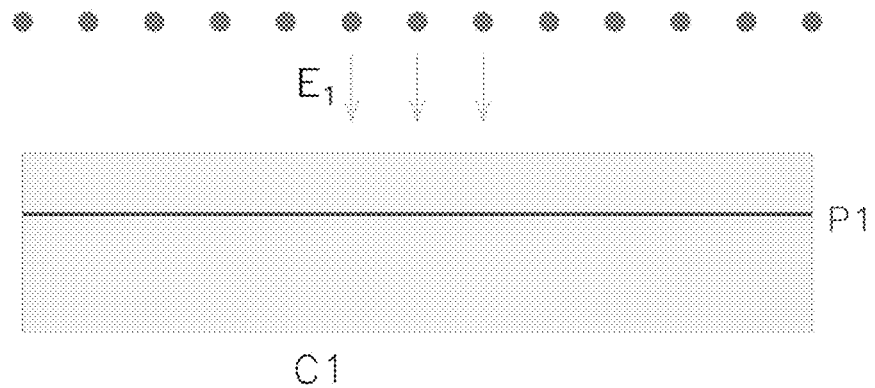
FIG. 5 schematically shows irradiation of a KTiOPO$_4$ (KTP) crystal with a chloride ion beam carrying high energy when performing steps (S21)-(S23) in the method in accordance with an embodiment of the present disclosure.
Figure 6:
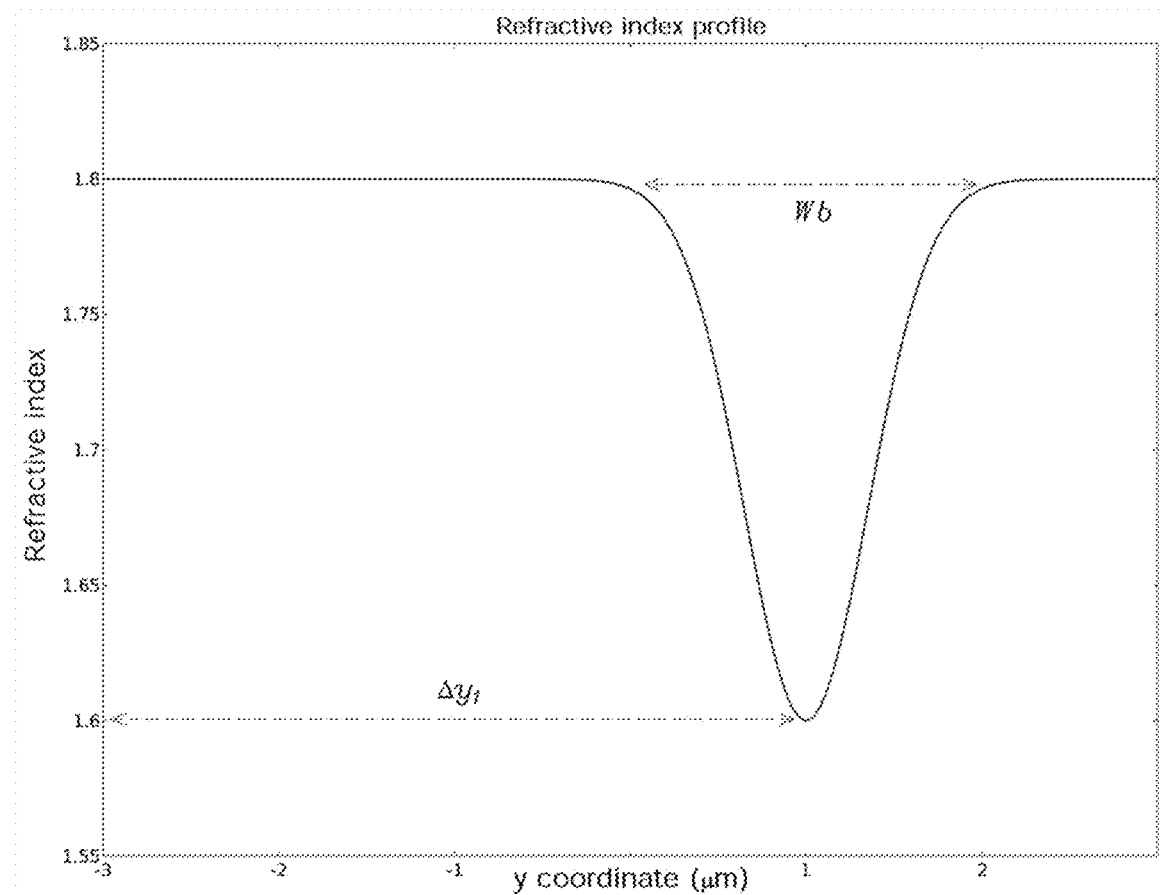
FIG. 6 shows refractive index distribution along a depth direction of a primary processed KTP crystal obtained by performing the steps (S21)-(S23) in accordance with an embodiment of the present disclosure, where the abscissa represents a depth value of the primary processed KTP crystal, and the ordinate represents a refractive index of the primary processed KTP crystal.
Figure 7:
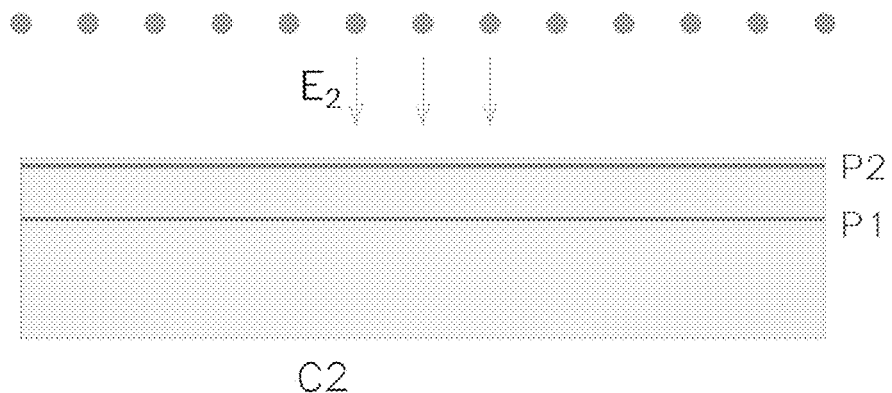
FIG. 7 schematically shows irradiation of a KTP processed crystal with a chloride ion beam carrying the sub-high energy when performing steps (S31)-(S33) on the primary KTP processed crystal in the method in accordance with an embodiment of the present disclosure.
Figure 8:
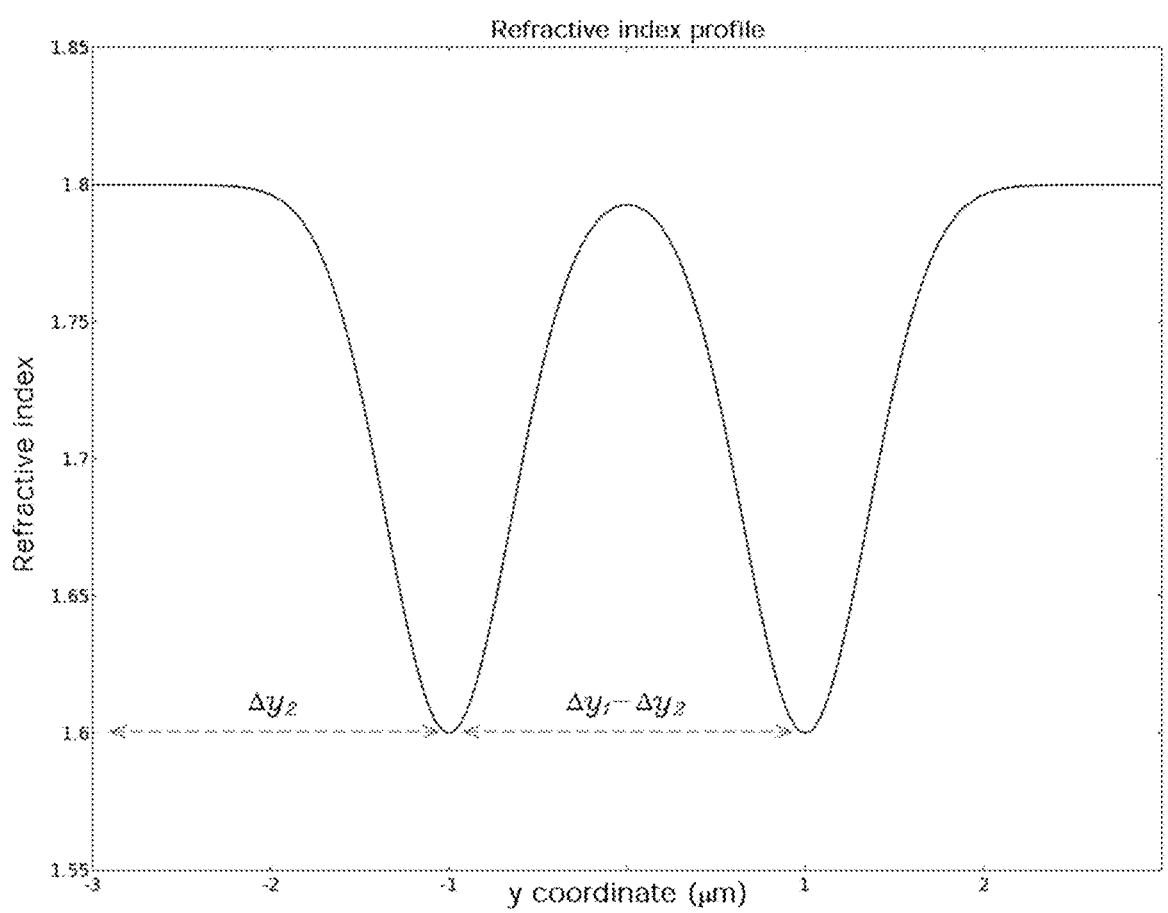
FIG. 8 shows refractive index distribution along a depth direction of a secondary processed KTP crystal obtained by performing the steps (S31)-(S33) in accordance with an embodiment of the present disclosure, where the abscissa represents a depth value of the secondary processed KTP crystal, and the ordinate represents a refractive index of the secondary processed KTP crystal.
Figure 9:
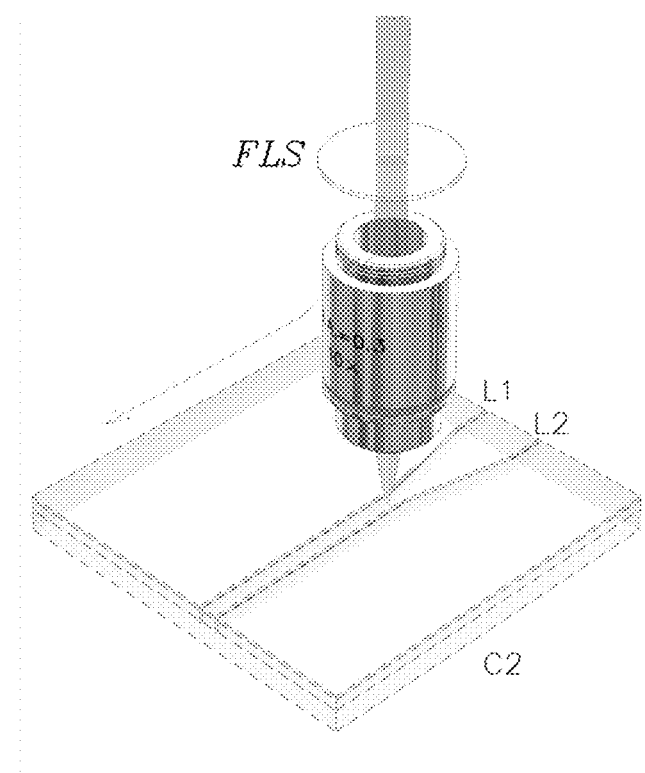
FIG. 9 schematically shows surface patterning processing in the method in accordance with an embodiment of the present disclosure.
Figure 10:
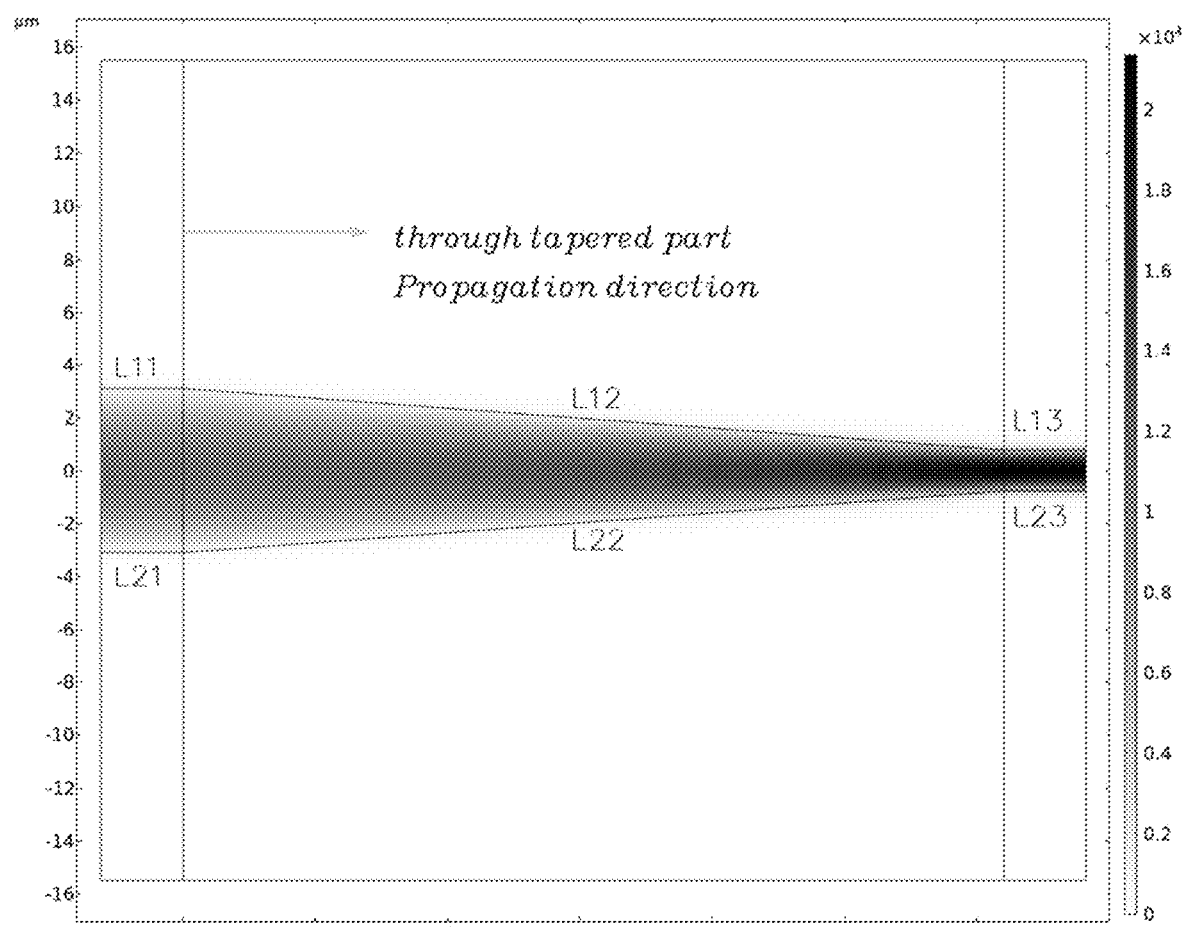
FIG. 10 shows light intensity distribution of a tapered transition section in an optical waveguide fabricated by the method in accordance with an embodiment of the present disclosure when an incident light in a 1.55-micron wavelength band is introduced into the optical waveguide, where the abscissa corresponds to a light propagation direction, the ordinate corresponds to a width direction of the optical waveguide, and the color indicates magnitude of light intensity.
Figure 11:
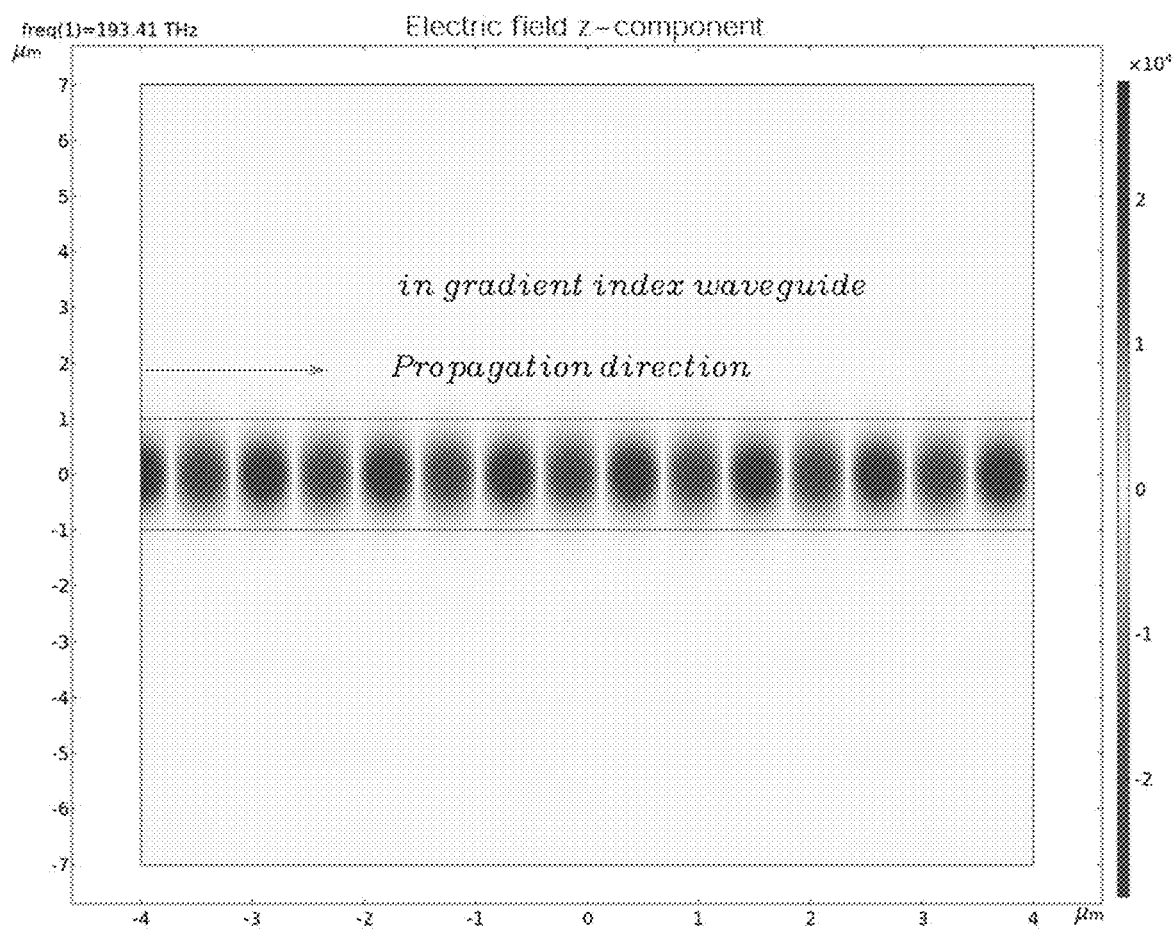
FIG. 11 shows z-component distribution of a photoelectric field in the optical waveguide when the incident light in the 1.55-micron wavelength band is introduced into the optical waveguide, where the abscissa corresponds to a light propagation direction, the ordinate corresponds to a depth direction of the optical waveguide, and the color indicates a z-component value of the photoelectric field.
Figure 12:
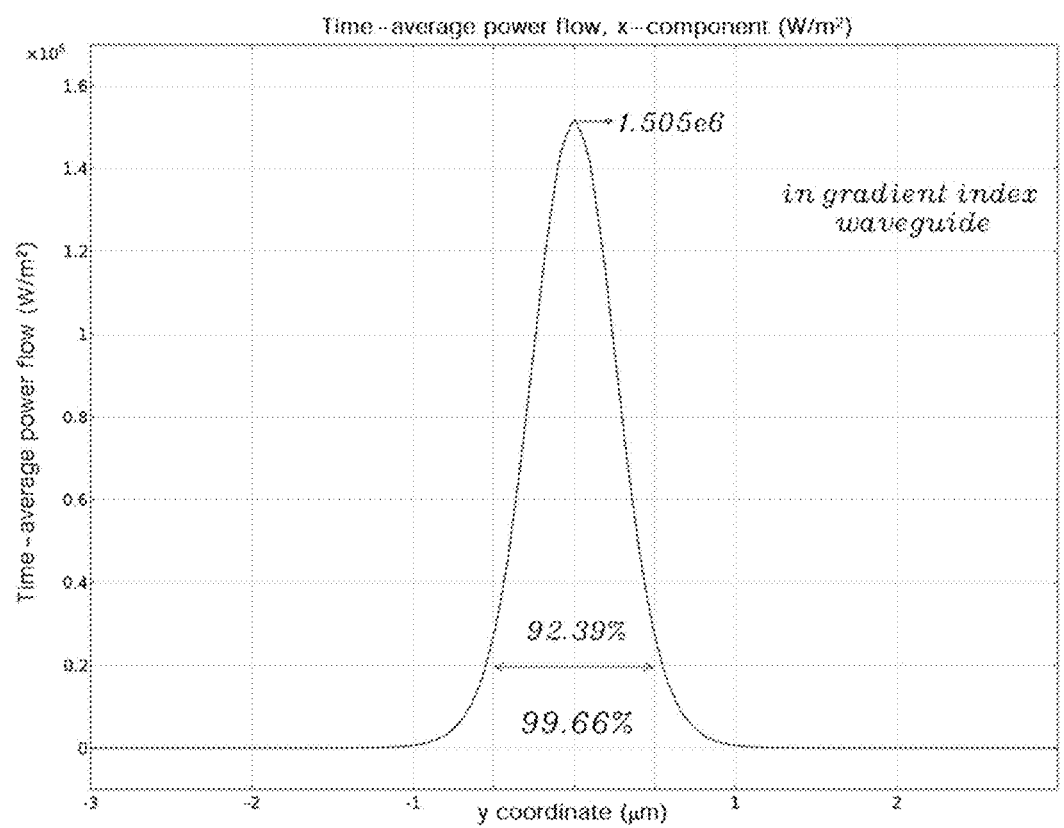
FIG. 12 shows power density distribution along the depth direction of the optical waveguide when the incident light in the 1.55-micron wavelength band is introduced into the optical waveguide, where the abscissa represents a depth value of the optical waveguide, and the ordinate represents a power density in the optical waveguide.
Figure 13:
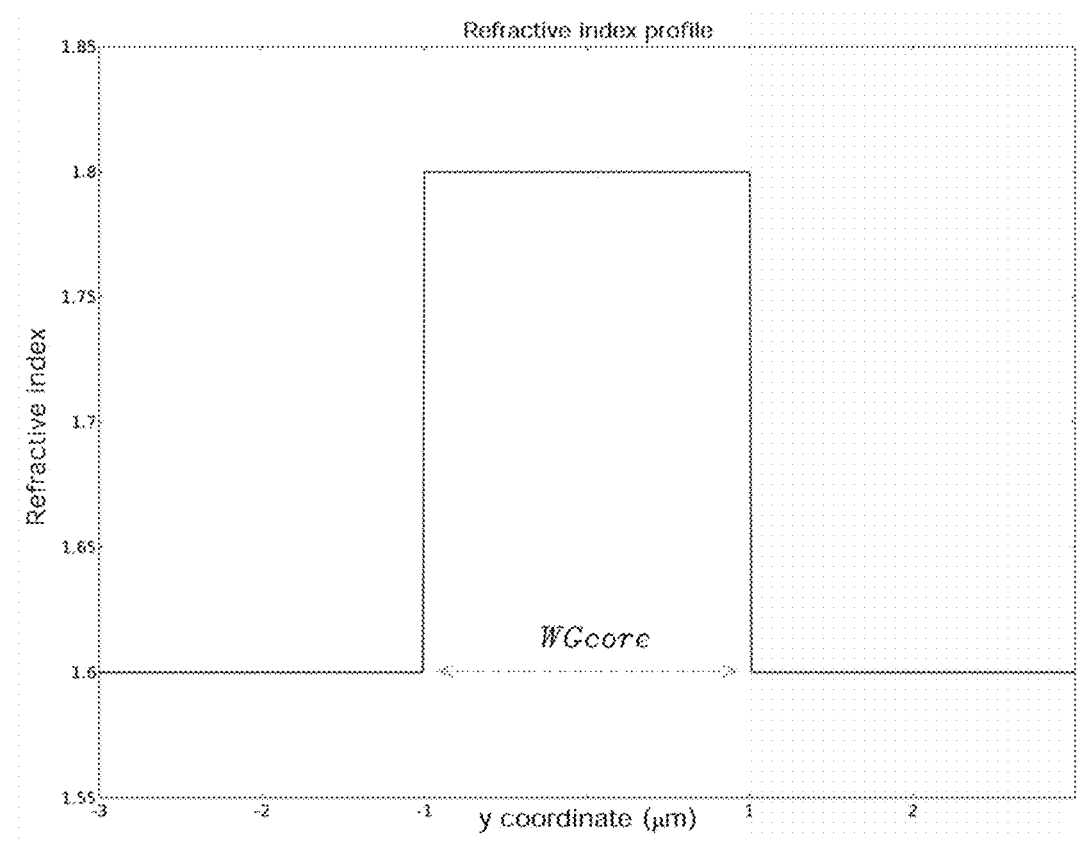
FIG. 13 shows refractive index distribution along a depth direction of a step-index KTP optical waveguide, where the abscissa represents a depth value of the step-index KTP optical waveguide, and the ordinate represents a relative refractive index of the step-index KTP optical waveguide.
Figure 14:
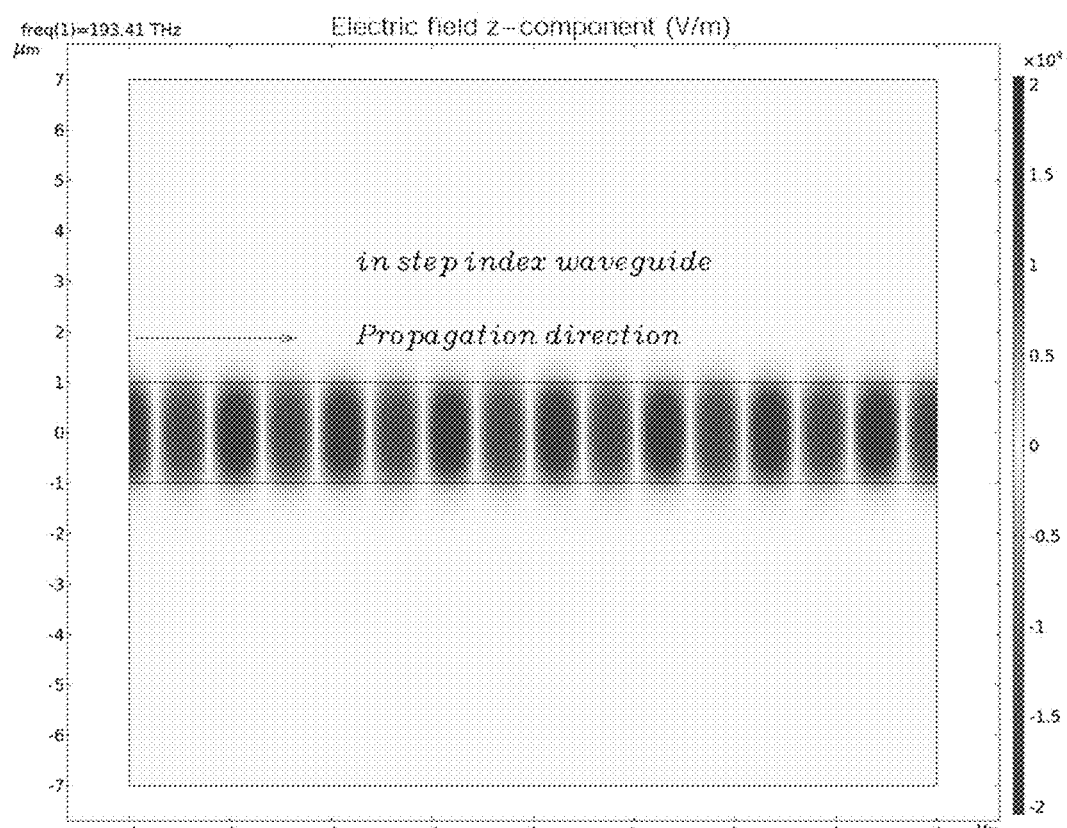
FIG. 14 shows z-component distribution of a photoelectric field in the step-index KTP optical waveguide when the incident light in the 1.55-micron wavelength band is introduced into the step-index KTP optical waveguide, where the abscissa corresponds to a light propagation direction, the ordinate corresponds to a depth direction of the step-index KTP optical waveguide, and the color indicates a z-component value of the photoelectric field.
Figure 15:
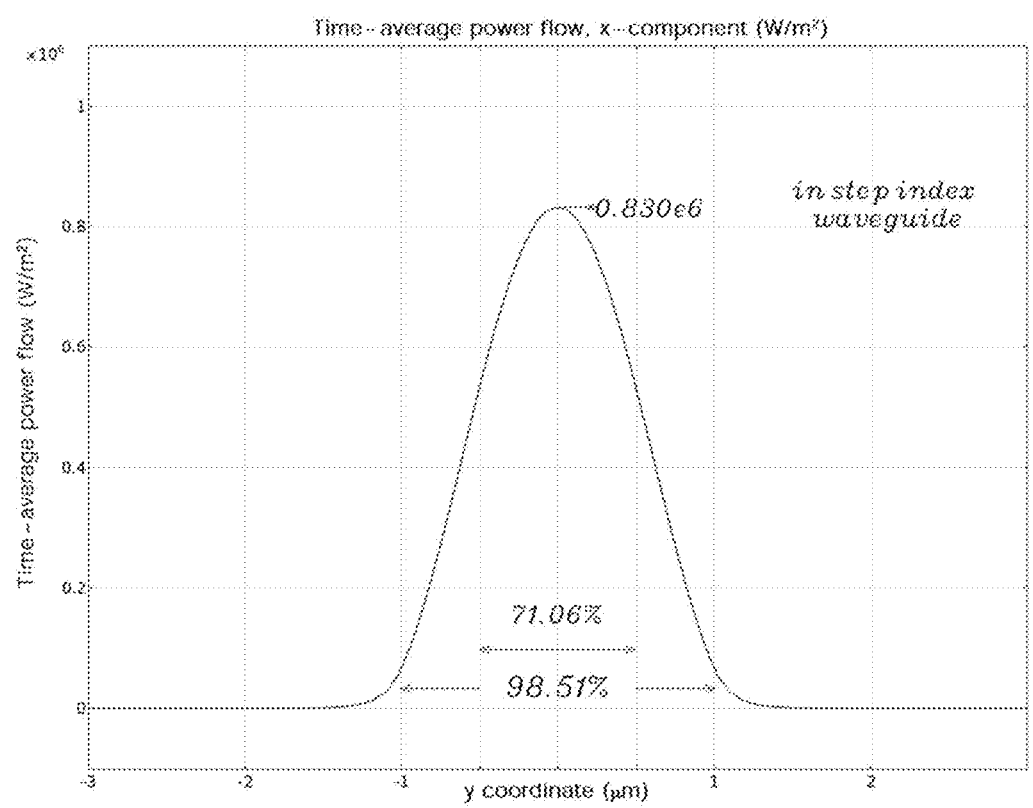
FIG. 15 shows power density distribution along the depth direction of the step-index KTP optical waveguide when the incident light in the 1.55-micron wavelength band is introduced into the step-index KTP optical waveguide, where the abscissa corresponds to a depth value of the step-index KTP optical waveguide, and the ordinate represents a power density in the step-index KTP optical waveguide.

Referring to FIGS. 4-12, a method for fabricating an optical waveguide with a focusing capability is provided, which includes the following steps.

(S1) Preparation for Irradiation Processing

A desired nonlinear optical crystal is prepared, and a type of first heavy ions, a type of second heavy ions and parameters related to an irradiation process are determined.

(S2) Primary High-Energy Ion Irradiation

The first heavy ions are accelerated to generate a first ion beam carrying a first energy $E_1$. The desired nonlinear optical crystal is bombarded with the first ion beam to form a first refractive index dip at a first depth $\Delta y_1$ of the nonlinear optical crystal along a depth direction of the nonlinear optical crystal, so as to obtain a primary processed crystal.

(S3) Secondary High-Energy Ion Irradiation

The second heavy ions are accelerated to generate a second ion beam carrying a second energy $E_2$. The primary processed crystal is bombarded with the second ion beam to form a second refractive index dip at a second depth $\Delta y_2$ along a depth direction of the primary processed crystal, so as to obtain a secondary processed crystal.

(S4) Surface Patterning Processing

The secondary processed crystal is segmented along a width direction to obtain the optical waveguide.

Specifically, in some embodiments, the method includes the following sub-steps.

(S11) A KTiOPO$_4$ (KTP) crystal rough stone is selected. A 10 mm (length)×8 mm (width)×2 mm (height) cuboid block is cut from the KTP crystal rough stone, and is configured as an original KTP crystal.

(S12) An upper surface, a light-input end face and a light-output end face of the original KTP crystal are polished to obtain a crystal block as a KTP crystal C0 required for processing.

(S13) After being irradiated by any of fluorine, chlorine, and argon ions, the nonlinear optical crystal can exhibit a gradient change in the refractive index. The main difference in the effects of the three ions lies in the width Wb of the formed refractive index dips. The refractive index dip caused by fluorine ions has a width of about 1 μm, the refractive index dip caused by chlorine ions has a width of about 2 μm, and the refractive index dip caused by argon ions has a width of about 3 μm. In this specific embodiment, chloride ions are selected as heavy ions for irradiation treatments.

(S14) Based on a Monte Carlo algorithm, the first energy $E_1$ is determined according to the first depth $\Delta y_1$.

(S15) Similarly, based on the Monte Carlo algorithm, the second energy $E_2$ is determined according to the second depth $\Delta y_2$.

(S21) The KTP crystal C0 is placed in an irradiation target chamber.

(S22) The first chloride ions are accelerated by an ion accelerator to generate the first ion beam carrying the first energy $E_1$.

(S23) The KTP crystal C0 is bombarded with the first ion beam to form a first refractive index dip P1 at a depth $\Delta y_1$ of the KTP crystal C0, so as to obtain a primary KTP processed crystal C1.

(S31) The primary KTP processed crystal C1 is placed in the irradiation target chamber.

(S32) The second chloride ions are accelerated by the ion accelerator to generate the second ion beam carrying the second energy $E_2$. The energy $E_2$ is adjusted to be less than the energy $E_1$.

(S33) The primary KTP processed crystal C1 is bombarded with the second ion beam to form a second refractive index dip P2 at a depth $\Delta y_2$ of the primary KTP processed crystal C1, so as to obtain a secondary KTP processed crystal C2. After the primary high-energy ion irradiation and the secondary high-energy ion irradiation in steps (S2)-(S3) are completed, a sandwich-type optical waveguide structure with two optical barriers along the depth direction of the secondary KTP processed crystal C2 the crystal is formed, so that the secondary KTP processed crystal C2 has a focusing effect in the depth direction, and can effectively constrain the light field to converge to the center of the optical waveguide structure in the depth direction.

(S41) In order to constrain the light field in a width direction to minimize the divergence of light in the width direction, in this embodiment, the secondary KTP processed crystal C2 is placed on a three-axis electric workbench, and an upper surface of the secondary KTP processed crystal C2 is ablated along a beam propagation direction by using a titanium sapphire femtosecond laser processing system FLS to form a first optical waveguide side L1 on the upper surface of the secondary KTP processed crystal C2.

(S42) The upper surface of the secondary KTP processed crystal C2 is ablated along the beam propagation direction by using the titanium sapphire femtosecond laser processing system FLS to form a second optical waveguide side L2 on the upper surface of the secondary KTP processed crystal C2. A portion enclosed by the first optical waveguide side L1 and the second optical waveguide side L2 is the optical waveguide.

The titanium sapphire femtosecond laser processing system FLS uses linearly polarized light with a wavelength of 796 nm as a light source. The light source has a polarization direction parallel to a height direction of the KTP nonlinear optical crystal. The titanium sapphire femtosecond laser processing system is adjusted to a laser pulse duration of 120 femtoseconds and a repetition rate of 1 kHz. The laser beam is focused through a microscope objective and scanned along a specific route over the sample placed on the three-axis electric workbench. The scanning speed and pulse energy are set to 50 μm/s and 0.7 μJ, respectively.

After the two scans, the upper surface of the secondary KTP processed crystal C2 is divided into three areas by the first light guide side L1 and the second light guide side L2. A portion enclosed by the first light guide side L1 and the second light guide side L2 is selected, which is a crystal structure that presents a sandwich waveguide structure along the depth direction, is separated from other portions along the width direction, and extends from the light-input end face to the light-output end face. Such a crystal structure can be used as a mature optical waveguide in a specific optical path.

In an embodiment, along a direction from the light-input end face to the light-output end face of the secondary KTP processed crystal C2, the first optical waveguide side L1 includes a first input section L11, a first transition section L12 and a first output section L13 in sequence, and the second optical waveguide side L2 includes a second input section L21, a second transition section L22 and a second output section L23 in sequence; the first input section L11 has the same length as the second input section L21, and is parallel to the second input section L21; the first transition section L12 has the same length as the second transition section L22, and a spacing between the first transition section L12 and the second transition section L22 is gradually decreasing; and the first output section L13 has the same length as the second output section L23, and is parallel to the second output section L23.

Along the direction from the light-input end face to the light-output end face of the secondary KTP processed crystal C2, the first optical waveguide side L1 and the second optical waveguide side L2 roughly enclose a tapered or trumpet-shaped surface shape. Such a shape leads to a continuously decreasing transmission cross-sectional width of the light beam in the optical waveguide, which plays a role in transversely focusing the light beam. Moreover, when an end coupling device is arranged at the light-input end face of the optical waveguide, the light is coupled into the current optical waveguide structure through the end coupling device. Since the optical waveguide structure partially presents a tapered shape that gradually narrows along the light propagation direction from the light-input end face to the light-output end face, the cross-sectional size at the light-input end face is relatively large, which can be easily adapted to the end coupling device, thereby reducing coupling loss to the greatest extent.

An optical waveguide is also provided herein, which is fabricated by the above method.

A frequency converter is also provided, including the above optical waveguide.

The embodiments described above are merely illustrative of the present disclosure, and are not intended to limit the patent scope of the present in disclosure. Any equivalent structural transformation or direct/indirect application in other related technical fields made using the description and drawings of the present disclosure without departing from the concept of the disclosure shall fall within the scope of the disclosure defined by the appended claims.

What is claimed is:

1. A method for fabricating an optical waveguide with a focusing capability, comprising:
   (S1) preparing a desired nonlinear optical crystal, and determining a type of first heavy ions, a type of second heavy ions and parameters related to an irradiation process;
   (S2) accelerating the first heavy ions to generate a first ion beam; and bombarding the desired nonlinear optical crystal with the first ion beam to form a first refractive index dip at a first depth along a depth direction of the nonlinear optical crystal, so as to obtain a primary processed crystal;
   (S3) accelerating the second heavy ions to generate a second ion beam; and bombarding the primary processed crystal with the second ion beam to form a second refractive index dip at a second depth along a depth direction of the primary processed crystal, so as to obtain a secondary processed crystal; and
   (S4) segmenting the secondary processed crystal to obtain the optical waveguide; wherein the first heavy ions and the second heavy ions are both chloride ions; the desired nonlinear optical crystal is a KTiOPO$_4$ (KTP) crystal;
   step (S4) comprises:
   (S4.1) ablating, by a surface ablation device, an upper surface of the secondary processed crystal to form a first optical waveguide side; and
   (S4.2) ablating, by the surface ablation device, the upper surface of the secondary processed crystal to form a second optical waveguide side, wherein a portion enclosed by the first optical waveguide side and the second optical waveguide side is the optical waveguide;
   wherein each of the first optical waveguide side and the second optical waveguide side extends from a light-input end surface of the secondary processed crystal to a light-output end surface of the secondary processed crystal;
   along a direction from the light-input end surface to the light-output end surface, the first optical waveguide side comprises a first input section, a first transition section and a first output section in sequence, and the second optical waveguide side comprises a second input section, a second transition section and a second output section in sequence;
   along the direction from the light-input end surface to the light-output end surface, the first input section has the same length as the second input section, the first input section is parallel to the second input section, the first transition section has the same length as the second transition section, a spacing between the first transition section and the second transition section is decreasing, the first output section has the same length as the second output section, and the first output section is parallel to the second output section; and
   a titanium sapphire femtosecond laser processing system serves as the surface ablation device to ablate the secondary processed crystal.

2. The method of claim 1, wherein step (S2) comprises:
   (S2.1) placing the nonlinear optical crystal in an irradiation target chamber;
   (S2.2) accelerating, by an ion accelerator, the first heavy ions to generate the first ion beam; and
   (S2.3) bombarding the nonlinear optical crystal with the first ion beam to form a first optical barrier at the first depth along the depth direction of the nonlinear optical crystal, so as to obtain the primary processed crystal.

3. The method of claim 2, wherein step (S3) comprises:
   (S3.1) placing the primary processed crystal in the irradiation target chamber;
   (S3.2) accelerating, by the ion accelerator, the second heavy ions to generate the second ion beam; and
   (S3.3) bombarding the primary processed crystal with the second ion beam to form a second optical barrier at the second depth along the depth direction of the primary processed crystal, so as to obtain the secondary processed crystal.

4. The method of claim 3, wherein an energy carried by the first ion beam is greater than an energy carried by the second ion beam.

5. The method of claim 4, wherein step (S1) comprises:
   (S1.1) cutting an original nonlinear optical crystal to obtain a to-be-processed nonlinear optical crystal;
   (S1.2) polishing an upper surface, a light-input end face and a light-output end face of the to-be-processed nonlinear optical crystal to obtain the desired nonlinear optical crystal;
   (S1.3) determining the type of the first heavy ions and the type of the second heavy ions according to a light guiding requirement of the optical waveguide;
   (S1.4) analyzing the first optical barrier required by the optical waveguide, and determining the energy carried by the first ion beam according to the first depth where the first refractive index dip is located; and (S1.5) analyzing the second optical barrier required by the optical waveguide, and determining the energy carried by the second ion beam according to the second depth where the second refractive index dip is located.

\* \* \* \* \*